(12) United States Patent
Ames

(10) Patent No.: US 12,232,574 B2
(45) Date of Patent: Feb. 25, 2025

(54) 3D PRINTED FOOTWEAR WITH IMPROVED COSMETICS, COMFORT AND VENTILATION

(71) Applicant: Maxwell G. Ames, Greer, SC (US)

(72) Inventor: Maxwell G. Ames, Greer, SC (US)

( * ) Notice: Subject to any disclaimer, the term of this patent is extended or adjusted under 35 U.S.C. 154(b) by 76 days.

(21) Appl. No.: 18/074,732

(22) Filed: Dec. 5, 2022

(65) Prior Publication Data

US 2023/0172314 A1 Jun. 8, 2023

Related U.S. Application Data

(60) Provisional application No. 63/286,347, filed on Dec. 6, 2021.

(51) Int. Cl.
*A43D 3/02* (2006.01)
*B33Y 80/00* (2015.01)

(52) U.S. Cl.
CPC ............... *A43D 3/02* (2013.01); *B33Y 80/00* (2014.12); *A43D 2200/60* (2013.01)

(58) Field of Classification Search
CPC ....... A43D 3/02; A43D 2200/60; B33Y 80/00
See application file for complete search history.

(56) References Cited

U.S. PATENT DOCUMENTS

| | | | |
|---|---|---|---|
| 9,788,600 B2 | 10/2017 | Wawrousek et al. | |
| 10,188,319 B2 | 1/2019 | Schwartz et al. | |
| 10,244,818 B2 | 4/2019 | DesJardins et al. | |
| 2016/0051009 A1* | 2/2016 | Kormann | A43B 1/08 36/103 |
| 2018/0339445 A1* | 11/2018 | Loveder | A43B 1/04 |
| 2019/0029369 A1* | 1/2019 | VanWagnen | A43D 11/00 |
| 2019/0037969 A1 | 2/2019 | Busbee et al. | |
| 2019/0039309 A1 | 2/2019 | Busbee et al. | |
| 2023/0172314 A1* | 6/2023 | Ames | A43B 13/14 36/45 |

OTHER PUBLICATIONS

Macy O&P LLC; https://abcorp.com/3d-printing/; https://www.facebook.com/macyop/.

* cited by examiner

*Primary Examiner* — Kibrom K Gebresilassie
(74) *Attorney, Agent, or Firm* — Kirk A. Wilson; Joseph T. Guy; Patent Filing Specialist Inc.

(57) ABSTRACT

The present invention is directed towards customized 3D printed footwear articles and methods for designing and manufacturing 3D printed footwear having improved cosmetics, comfort and ventilation. The improved footwear articles and methods provide greater integration and/or customization of different components. The method used to manufacture the 3D printed footwear can be conceptualized, prototyped, designed both physically and digitally and then finally designed with specific additive manufacturing processes in mind. Upon completion of printing, the components are cleaned and then in any combination, the components are bonded and coated, or coated and bonded to each other.

14 Claims, 17 Drawing Sheets

Cell Size:
W•L•H=Cell size [mm³], a: .01mm-5mm
b: .01mm-30mm
c: .01mm-5mm
d: .01mm-5mm
e: .01mm-30mm

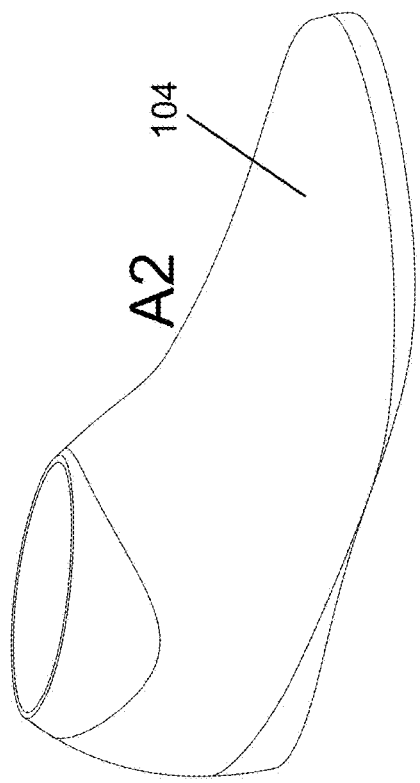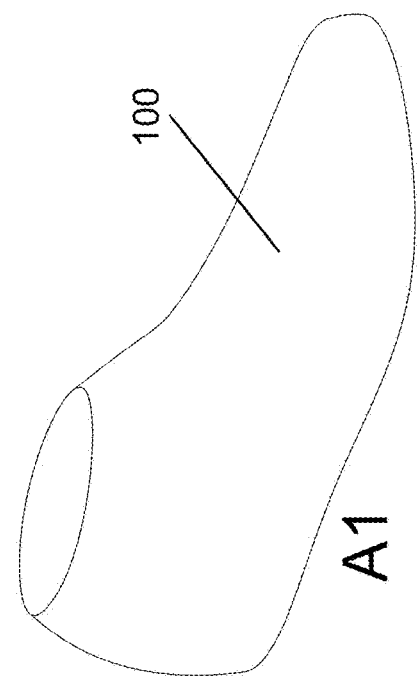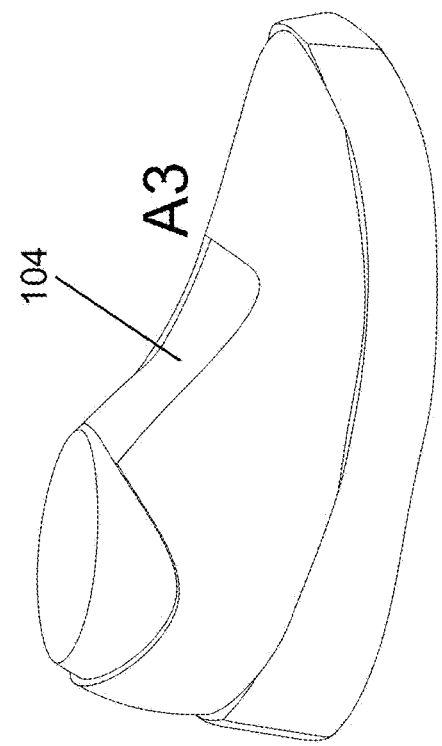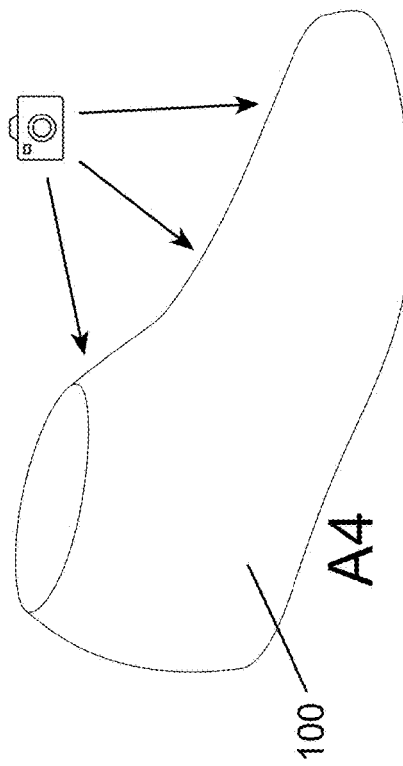
Fig. 5A

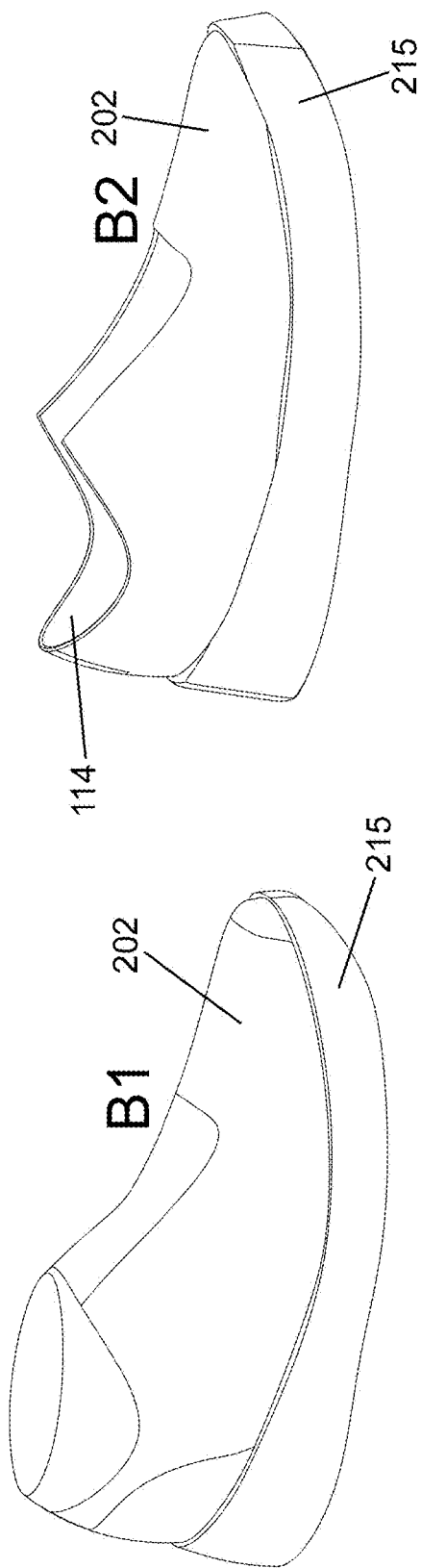
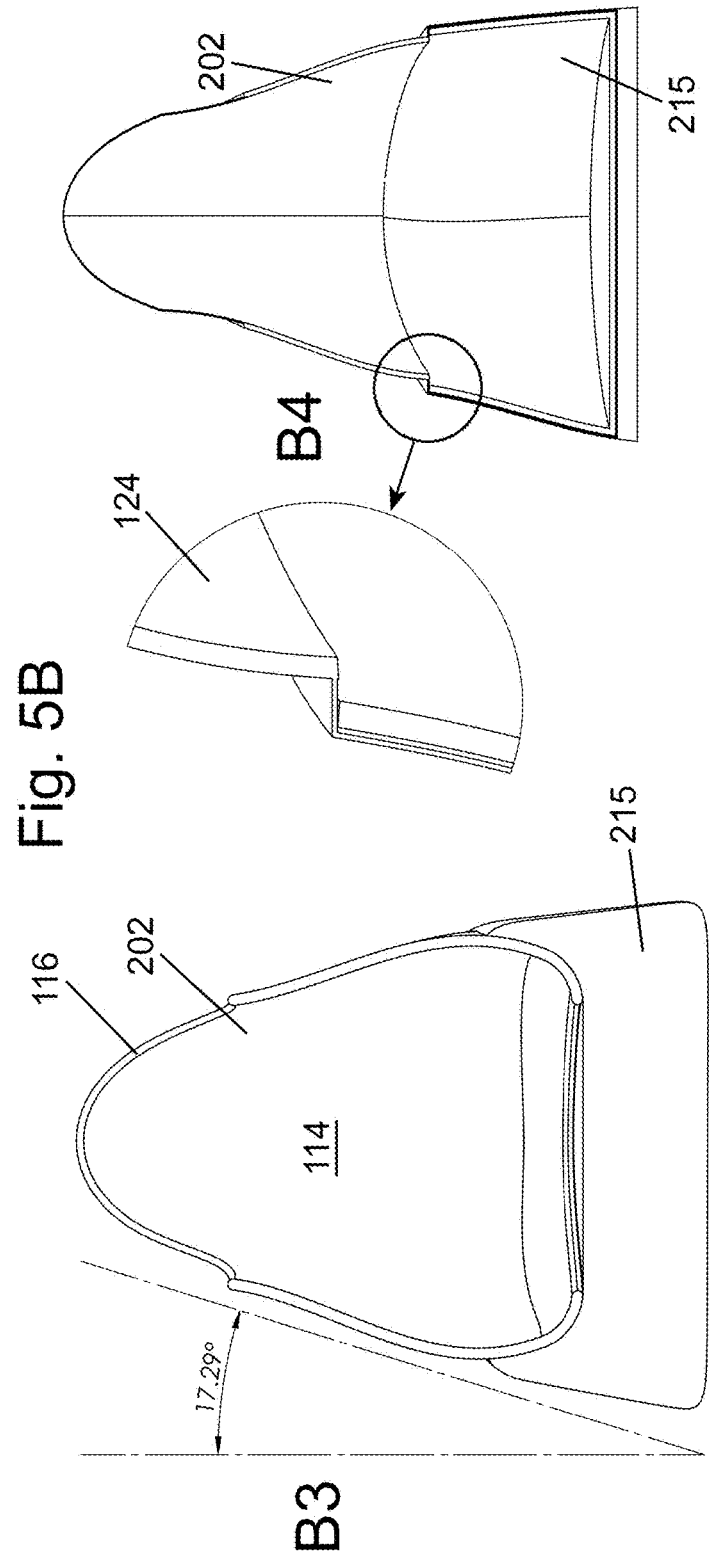
Fig. 5B

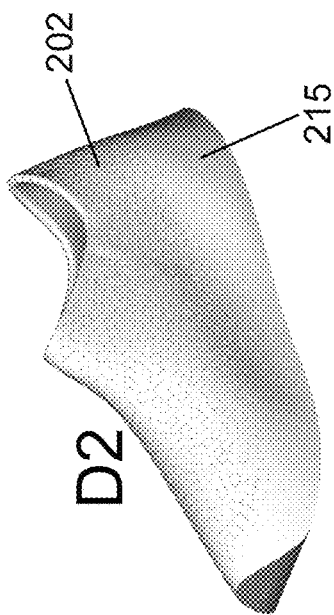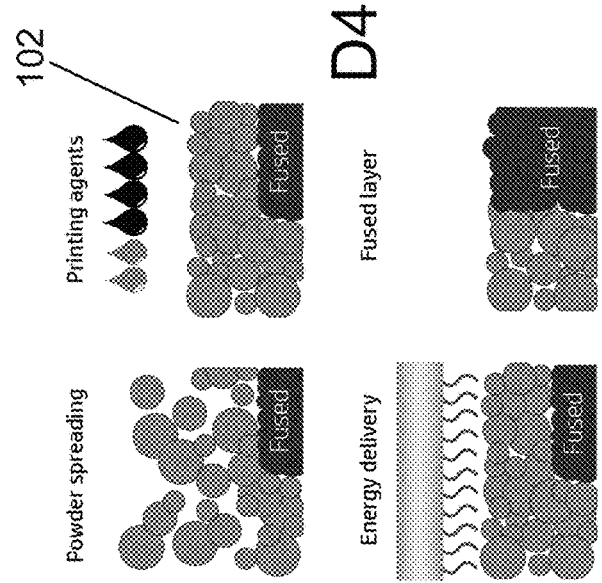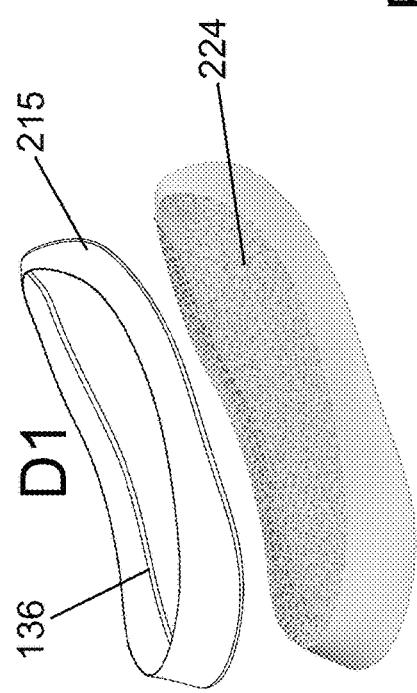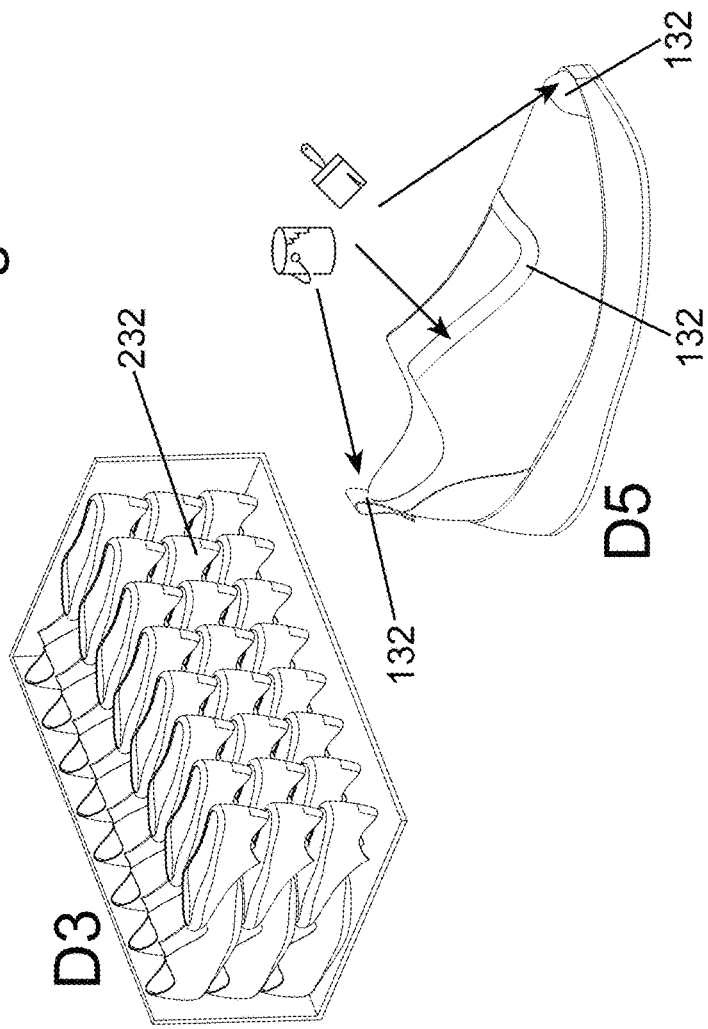
Fig. 5D

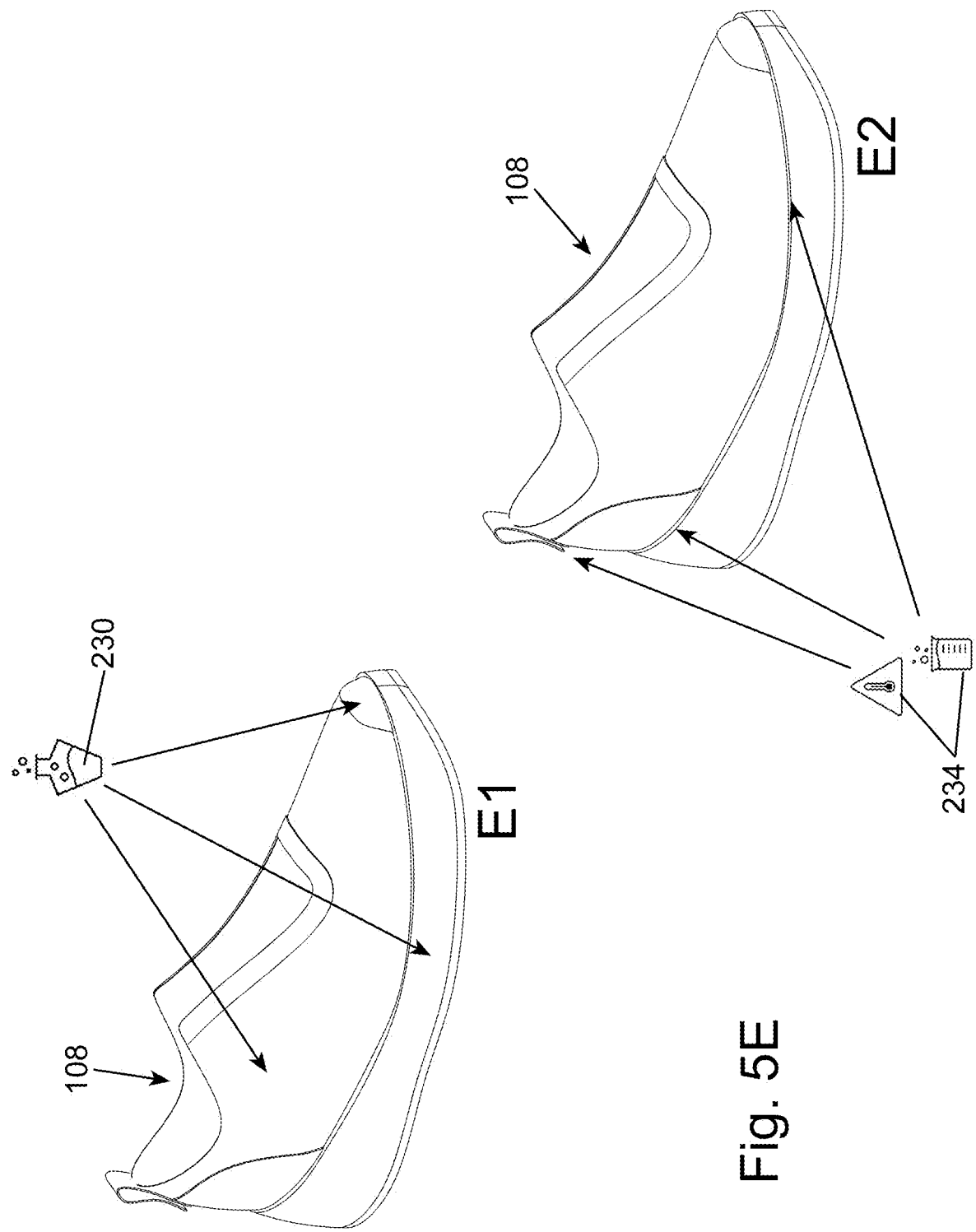

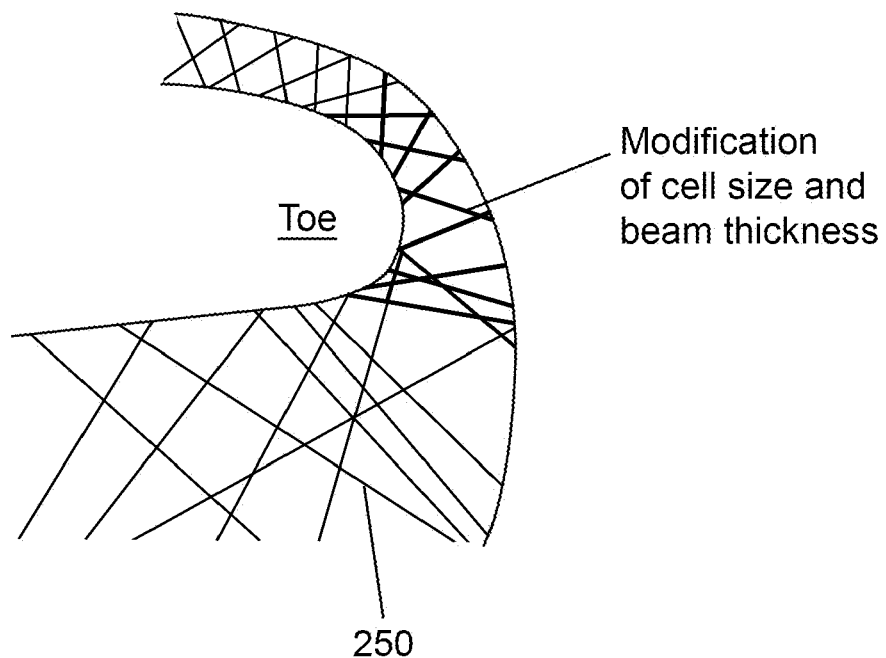
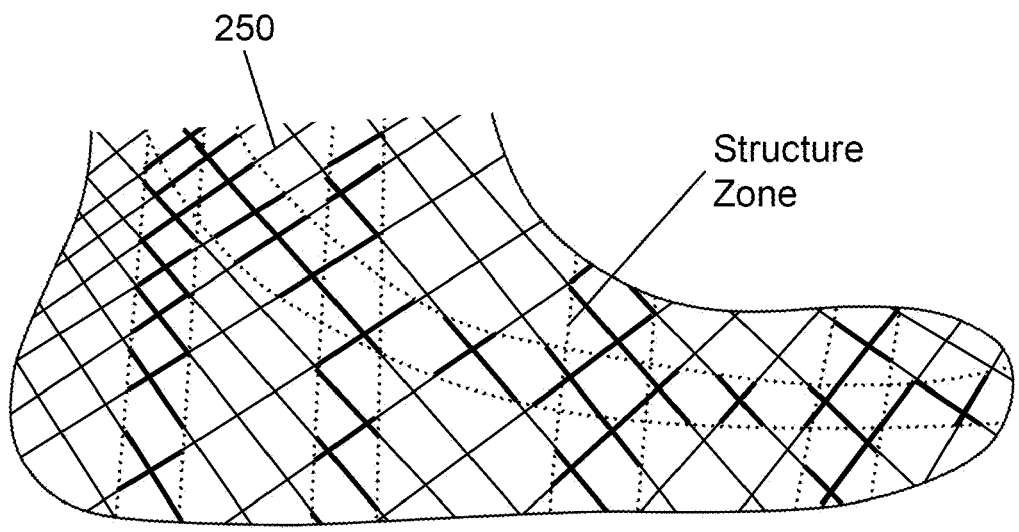
Fig. 10

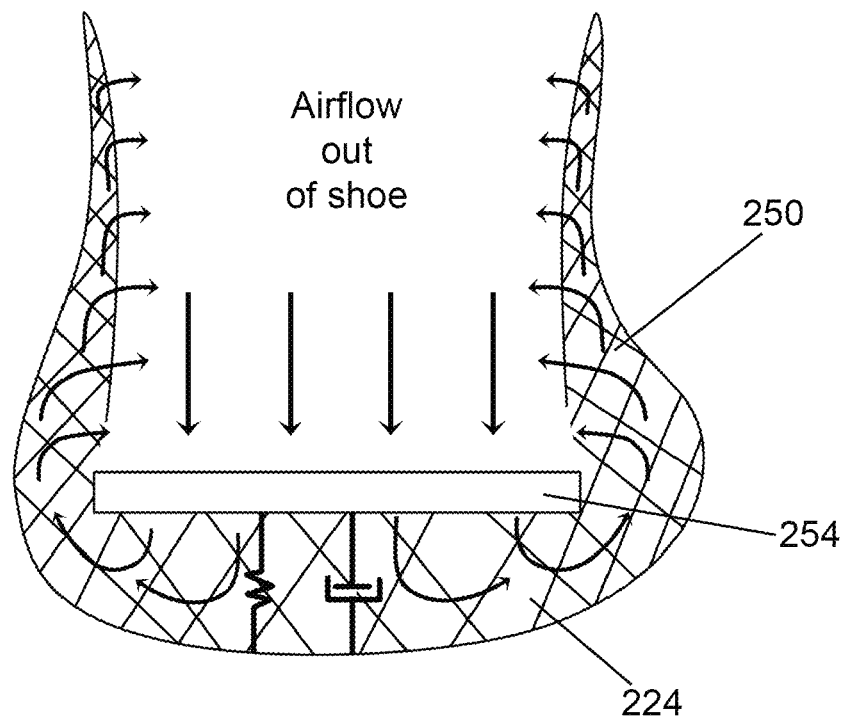
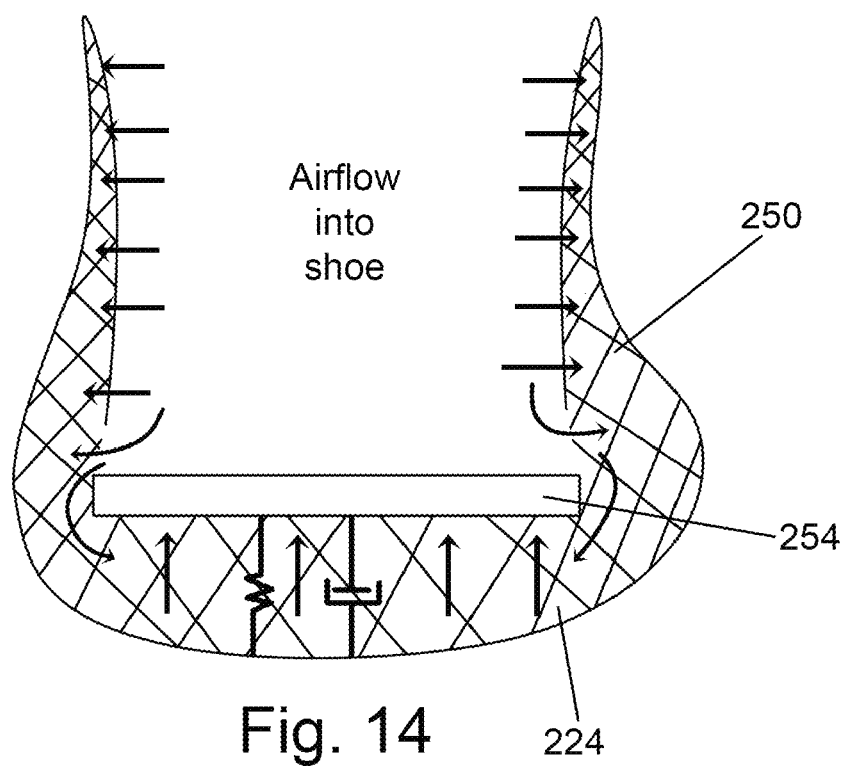
Fig. 14

3D PRINTED FOOTWEAR WITH IMPROVED COSMETICS, COMFORT AND VENTILATION

CROSS-REFERENCE TO RELATED APPLICATIONS

The present invention claims priority to U.S. Provisional Patent Application No. 63/286,347, filed Dec. 6, 2021, incorporated herein by reference in its entirety.

FIELD OF THE DISCLOSURE

The present invention generally relates to articles and methods involving three-dimensionally printed articles for use in footwear. The present subject matter involves, in some cases, interrelated products, alternative solutions to a particular problem, and/or a plurality of different uses of one or more systems, methods and articles.

BACKGROUND OF THE DISCLOSURE

Footwear is typically mass produced in large batches and with the use of complex supply chains. As a result, portions of a single article of footwear with different properties are typically formed from uniform components with standard sizes and properties which are adhered together or disposed on one another. This lowers the quality of the resultant footwear and makes its customization for specific users challenging. Accordingly, improved articles for use in footwear that allow greater integration and/or customization of different components and associated methods may be advantageous.

BRIEF SUMMARY OF THE INVENTION

A method for producing a 3D printed shoe is disclosed, by creating a 3D printed shoe last model in a CAD system connected to a 3D printer; printing the 3D printed shoe last model for construction of a conceptual model shoe last; documenting, with hand measurements or 3D scanning, the shapes and pieces of the conceptual model shoe last; initializing a first additive manufacturing design tool for construction of a 3D printed shoe in the CAD system by creating a first solid upper and a first solid lower from the conceptual model shoe last; subtracting the 3D printed shoe last model from a combination of the first solid upper and the first solid lower resulting in a void foot space between the combination of the first solid upper and the first solid lower; introducing a positive draft to the first solid upper interior walls and the first solid lower exterior walls to enable stacking onto each other on a build platform of the 3D printer; generating a joining rim with specific assembly aid dimensions between the first solid upper and first solid lower of the 3D printed shoe with the first solid lower positioned adjacent the assembly aid interior walls and the first solid upper positioned adjacent the assembly aid exterior walls; designing cosmetic features of the 3D printed shoe on top of the conceptual model shoe for the first solid upper or the first solid lower without merging; adding anchor points for at least one shoelace into the first solid upper without merging; initializing a second additive manufacturing design tool wherein walls in a second solid upper comprise second solid upper hollowed-out walls; adding a plurality of perforations having different shapes and sizes to a second solid upper interior wall; preventing a second solid upper exterior wall from being perforated, thereby preventing liquid or solid matter from entering the inside of the 3D printed shoe; generating a first organic lattice between the second solid upper and a second solid lower; hollowing, perforating, and a thickening the second solid upper and the first organic lattice to fill any internal voids; lightly perforating a second solid lower perforated portion positioned below the sole of the foot; hollowing a second solid lower hollowed portion; introducing a second organic lattice into the second solid lower hollowed portion with a specific cell size and thickness; merging the second solid upper to the second solid lower perforated portion; texturing the second solid upper outer walls of the second solid upper lower walls to reflect the cosmetic features of the conceptual model shoe; mixing and sorting different 3D printed shoe sizes in order of decreasing size for maximum packing density stacking of a 3D printed shoes build; printing the 3D printed shoes build using a build material; extracting, separating and cleaning the 3D printed shoes build; painting the cosmetic features of the 3D printed shoe; coating the second solid upper and second solid lower with a protective coating; bonding the second solid upper and second solid lower to each other; coating the cosmetic features with a protective coating; and bonding the cosmetic features to the second solid upper and second solid lower to generate a ventilated 3D printed shoe.

An article of 3D printed footwear is also disclosed, having a first solid upper and first solid lower configured for 3D printing using a shoe last model and a first additive manufacturing design tool; a second solid upper and second solid lower configured for 3D printing of a 3D printed shoe using the shoe last model, a second additive manufacturing design tool and a build material; wherein the 3D printed shoe comprises a first organic lattice, a second organic lattice, perforated portions, a moving membrane, and cosmetic features.

BRIEF DESCRIPTION OF THE DRAWINGS

A full and enabling disclosure directed to one of ordinary skill in the art, is set forth in the specification, which refers to the appended figures, in which:

FIGS. 5A-5E show typical structural elements for the method steps of FIG. 5;

FIG. 10 is an illustration of internal components for increased comfort;

FIG. 14 is an illustration of internal air passages and bellows for the improved ventilated shoe taught herein;

DETAILED DESCRIPTION OF THE INVENTION

Figure 1:
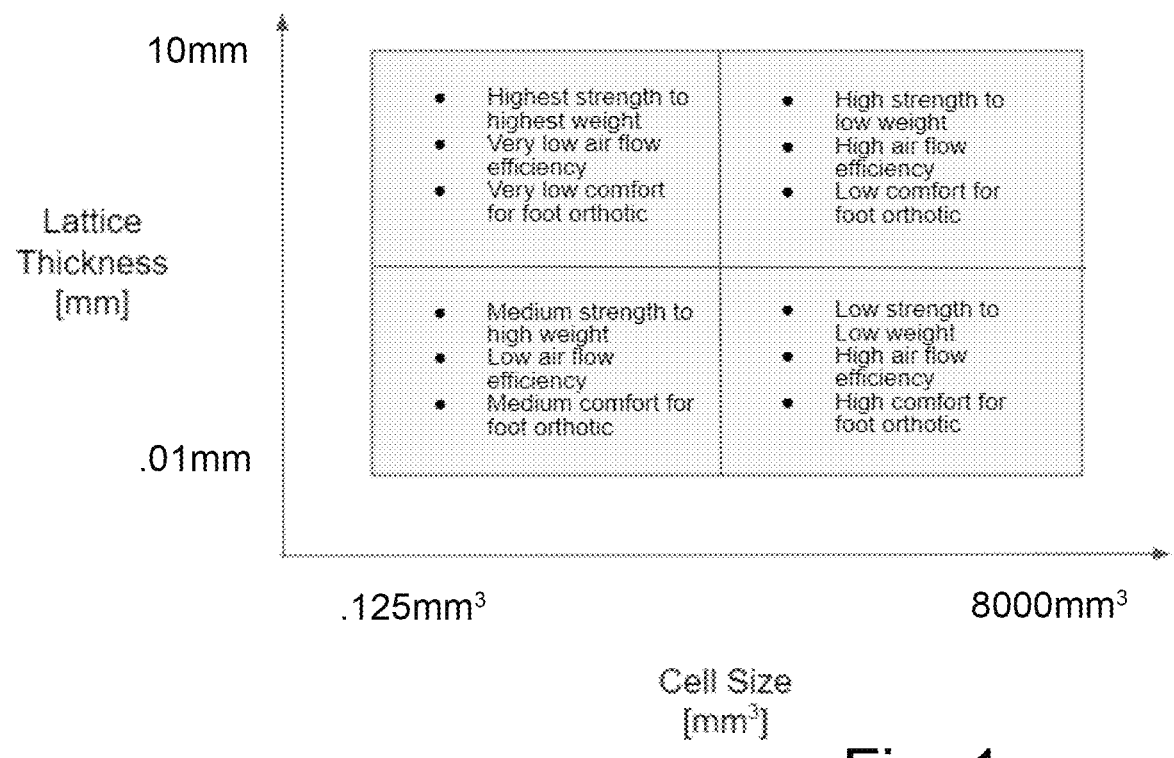
FIG. 1 is a graph of cell size and thickness ranges for various embodiments.
Figure 2:
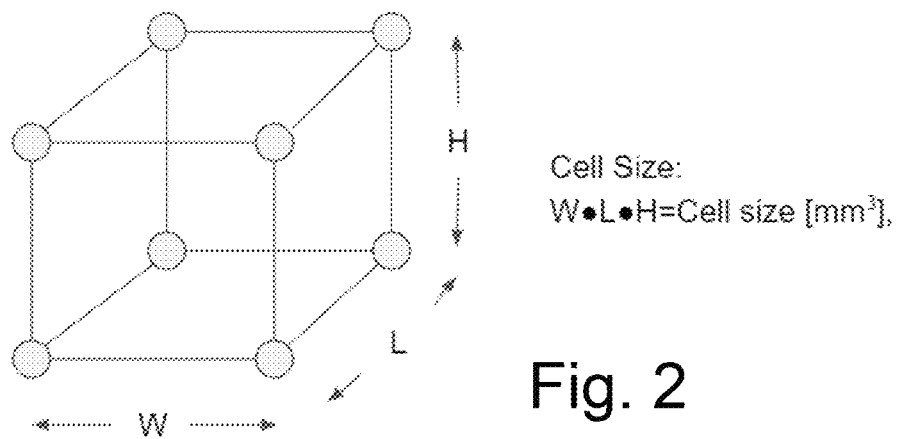
FIG. 2 illustrates dimensional definitions of cell size for a typical lattice.

Some embodiments of the present invention are described in this section in detail sufficient for one skilled in the art to practice the present invention without undue experimentation. It is to be understood, however, that the fact that a limited number of preferred embodiments are described does not in any way limit the scope of the present invention as set forth in the claims.

It is to be understood that whenever a range of values is described herein, i.e. whether in this section or any other part of this patent document, the range includes the end points and every point there between as if each and every such point had been expressly described. Unless otherwise stated, the words "about" and "substantially" as used herein are to be construed as meaning the normal measuring and/or fabrication limitations related to the value or condition which the word "about" or "substantially" modifies. Unless expressly stated otherwise, the term "embodiment" is used herein to mean an embodiment of the present invention.

The present invention is directed towards customized 3D printed footwear, and elements thereof, and related systems and methods for designing and manufacturing same. The improved footwear articles and methods provide greater integration and/or customization of different components. The method used to manufacture the 3D printed footwear can be conceptualized, prototyped, designed both physically and digitally and then finally designed with specific additive manufacturing processes in mind. Upon completion of printing, the components are cleaned and then in any combination, the components are bonded and coated, or coated and bonded to each other.

The typical 3D printer 102 and associated build material used in this invention can be a powder with a polyurethane base having the following properties: Using the DIN EN ISO 60 test method, the density of the material is on average, 0.01 g/cm$^3$ to 1 g/cm$^3$ in its bulk density (preprinting) with the optimal density at 0.5 g/cm$^3$ and using the DIN EN ISO 1183-1 test method, the printed part density is on average 0.5 g/cm$^3$ to 2 g/cm$^3$ with the optimal density at 1.1 g/cm$^3$. Using ISO 13320 test method, the mean particle size for this application is 50 d50/μm to 110 d50/μm with the optimal mean particle size within 70-90 d50/μm. Using ISO 11357 test method, the range of glass transition temperature of the material in the application is −60° C. to −20° C. with the optimal glass transition temperature being −48° C. Using ISO 11357 test method, the melting temperature of this material is in the range of 90° C. to 180° C. with the optimal range being 120° C.-150° C.

The typical 3D printer build material used in this invention can also have the following thermal properties: Using a UL 94 test method for UL flammability, the typical values for the x-direction are HB (0.90-6.1 mm) with the most optimal values at HB (1.6-4.2 mm). The typical values in the z-direction are HB (0.90-6.1 mm) with the most optimal values at HB (1.6-4.2 mm). Using DIN EN ISO 306 test method to determine Vicat/A (10 N)/° C. the typical values in the x direction are 87-108 with the optimal value of 97, and in the z-direction, the typical values are 88-110, with the optimal value of 98.

The typical 3D printer build material used in this invention can also have the following mechanical properties: Using DIN ISO 7619-1 test method to test the hardness shore A, the material had a typical value in the x-direction of 50-120 with the optimal value of 88-90, and in the z-direction, the material had a typical value of 50-120 with the optimal value of 88-90. Using DIN 53504, S2, to test the tensile strength of the material in MPa, the material had a typical value in the x-direction of 5-15, with an optimal value of 9, and in the z-direction, the material had a typical value of 4-14 with an optimal value of 7. Using the DIN 53504, S2 test method to test the tensile elongation at break %, the typical values for the material in the x-direction are 150-310 with an optimal value at 280, and in the z-direction, the material had a typical value of 100-200 with an optimal value of 150. Using ISO 527-2, 1A to test the Tensile modulus in MPa, the material had an average value in the x-direction of 65-110 with an optimal value of 85. The material had an average value in the z-direction of 65-110 with an optimal value of 85. Using DIN EN ISO 178 to test the flexural modulus in MPa, the material had an average value in the x-direction of 51-111 with an optimal value of 75, and in the z-direction, the material had an average value of 50-110 with an optimal value of 75 as well. Using DIN ISO 34-1, A test method to test the Tear resistance (propagation, Trouser) in kN/m, the material had an average value of 15-30 in the x-direction with an optimal value of 21, and in the z-direction the material had an average value of 12-30 with an optimal value of 18. Using DIN ISO 34-1, B test method to determine the Tear resistance (initiation, Graves) in kN/m, the material had an average value of 21-55 in the x-direction with an optimal value of 38 and had an average value of 19-56 in the z-direction with an optimal value of 32. Using DIN ISO 815-1 test method to determine the Compression Set B (23° C., 72 h) in %, the material had an average value of 10-32 in the x-direction with an optimal value of 23, and in the z-direction the material had an average value of 11-34 with an optimal value of 24. Using DIN 53512 test method to determine the Rebound resilience in %, the material had an average value of 44-82 with an optimal value of 63 in the x-direction and in the z-direction, the material had an average value of 44-82 with an optimal value of 63 as well. Using DIN ISO 4649 test method to determine the Abrasion resistance/mm$^3$ (method A), in the x-direction, the material had an average value of 81-120 with an optimal value of 96. In the z-direction, the material had an average value of 85-125 with an optimal value of 100. Using DIN EN ISO 179-1 test method to determine the Charpy Impact Strength (notched, 23° C.) in kJ/m$^2$, the material showed no breakage in the x-direction and also no breakage in the z-direction. Using DIN EN ISO 179-1 test method to determine the Charpy Impact Strength (notched, −10° C.) in kJ/m$^2$, the material showed no breakage in the x-direction and also no breakage in the z-direction. Using ASTM D1052 (method A) test method to determine the Fatigue behavior (Rossflex, 100 k cycles, 23° C.), in the x-direction no cut growth was found. Using ASTM D1052 (method A) test method to determine the Fatigue behavior (Rossflex, 100 k cycles, −10° C.), the material showed no cut growth in the x-direction.

The lattice cellular structure within the invention is constrained by several different factors. These factors all must fit within certain design ranges in order to be effective, otherwise the designs will not work. There are 6 main constraints that drive the lattice cellular structure within the invention and all of these parameters must work in conjunction. The 6 parameters are as follows in no particular order.

The lattice type is primarily a Voronoi structure but can also be a simple cubic, body centered cubic, face centered cubic, column, columns, diamond, fluorite, octet, truncated cube, truncated octahedron, kelvin cell, isotruss, re-entrant, weaire-phelan, triangular honeycomb, triangular honeycomb rotated, hexagonal honeycomb, re-entrant honeycomb, square honeycomb rotated, square honeycomb, face centered cubic foam, body centered cubic foam, simple cubic foam, quad central axis face surface, gyroid, schwarz, diamond, lidinoid, splitp, neovius, cube edge, cube vertex centroid face, and cube central axis edge face.

The lattice cell size controls the bounding box in which the cell exists. The size of the cell is driven by the thickness of the material in which it is occupying and also the operation in which the material is intended to perform. The primary operations in which the material is expected to perform are cell size and strength for effective air flow, and cell size and strength for enhanced comfort in foot orthotics. The ranges in which the cell sizes exist is approximately 0.125 mm$^3$-8,000 mm$^3$, the cell lattice thickness exists in a range from 0.01 mm-10 mm. This variability of ranges per cell and thickness is what gives the lattice design structure its unique properties. When the cell size is larger and the lattice thickness is larger, this gives the right characteristics for high strength to the lowest weight. When the cell size is larger and the lattice thickness is larger, this gives a very high air flow efficiency. When the cell size is larger and the lattice thickness is larger, this gives a lower rating for comfort in foot orthotics. When the cell size is larger and the lattice thickness is smaller, this gives a low strength to low weight. When the cell size is larger and the lattice thickness is smaller, this also gives a high airflow efficiency. When the cell size is larger and the lattice thickness is smaller, this gives a very high rating for comfort in foot orthotics. When the cell size is smaller and the lattice thickness is larger, this gives a high strength rating to a very high weight. When the cell size is smaller and the lattice thickness is larger, this gives a very low air flow efficiency rating as there is no room for the air to flow. When the cell size is smaller and the lattice thickness is larger, this gives a very low comfort rating for foot orthotics as this is essentially a solid object. When the cell size is smaller and the lattice thickness is smaller, this gives a medium strength to high weight characteristic. When the cell size is smaller and the lattice thickness is smaller, this gives a low airflow efficiency. When the cell size is smaller and the lattice thickness is smaller, this gives a medium comfort rating for foot orthotics.

Figure 3:
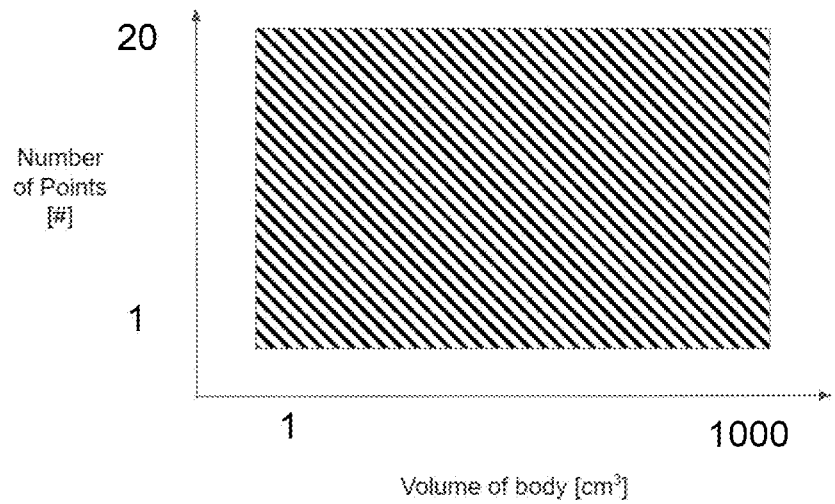
FIG. 3 is a graph of point density, number of points versus volume of body.
Figure 4:
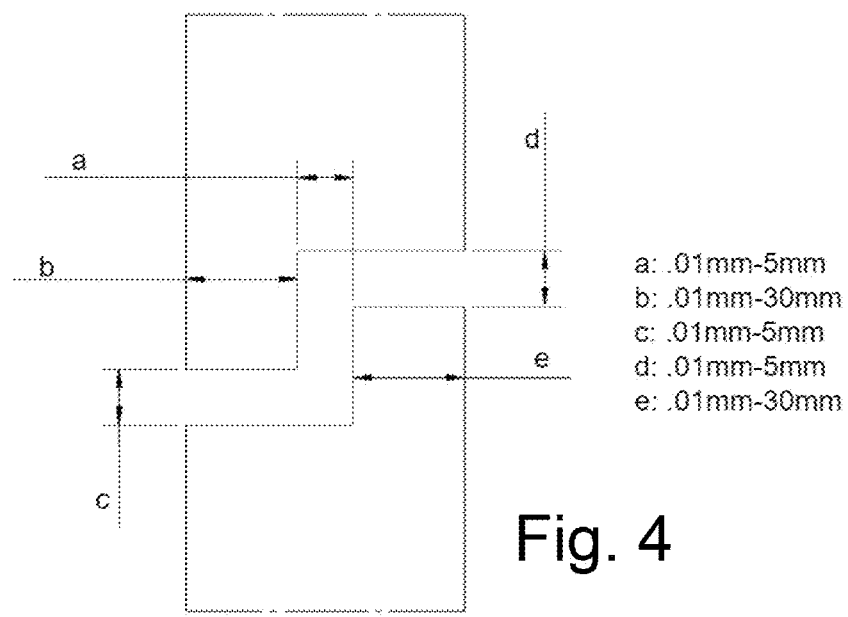
FIG. 4 is a graph of cell size versus lattice thickness for strength to weight.
Figure 5:
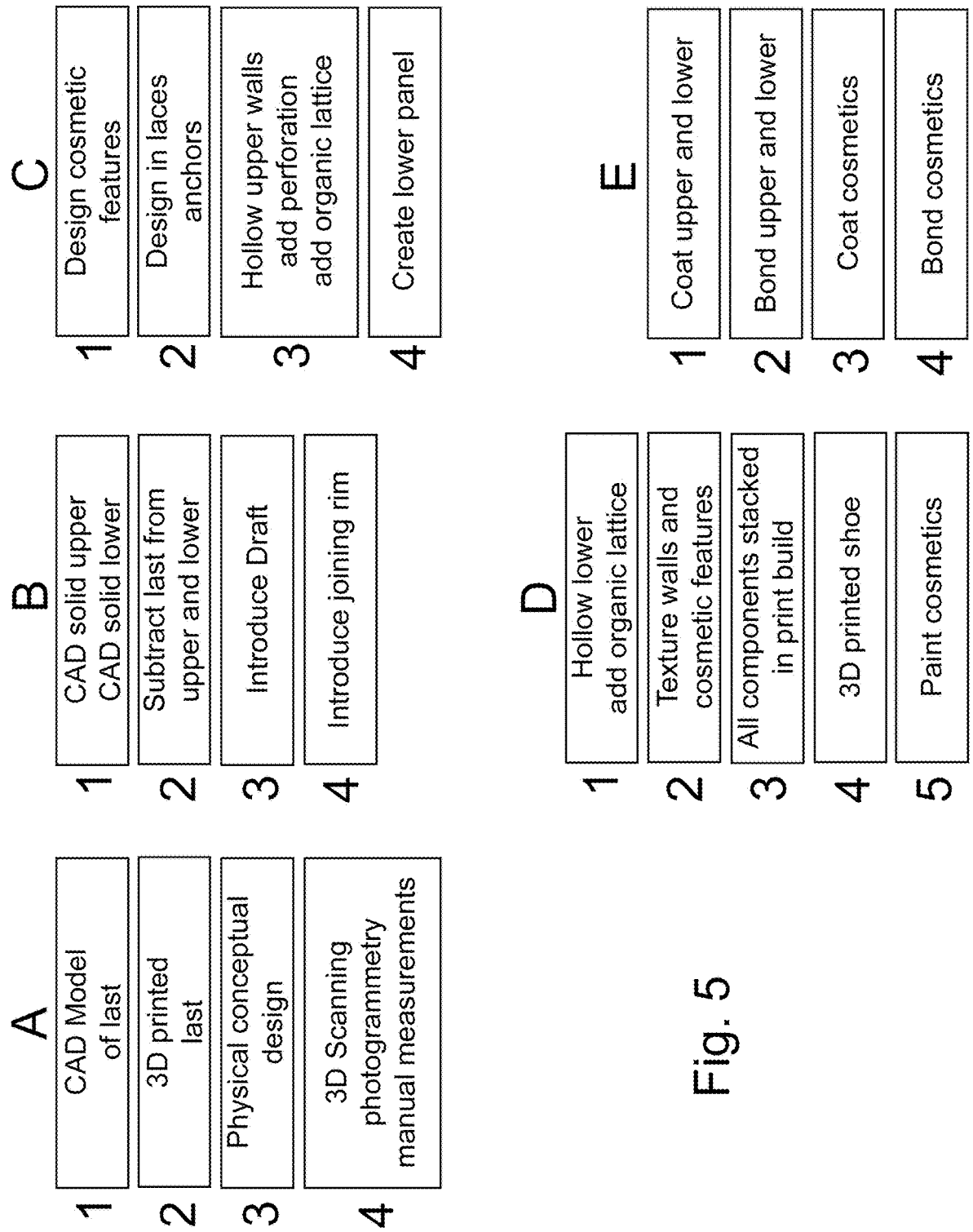
FIG. 5 is a flowchart of method steps for producing a 3D printer shoe.
Figure 5C:
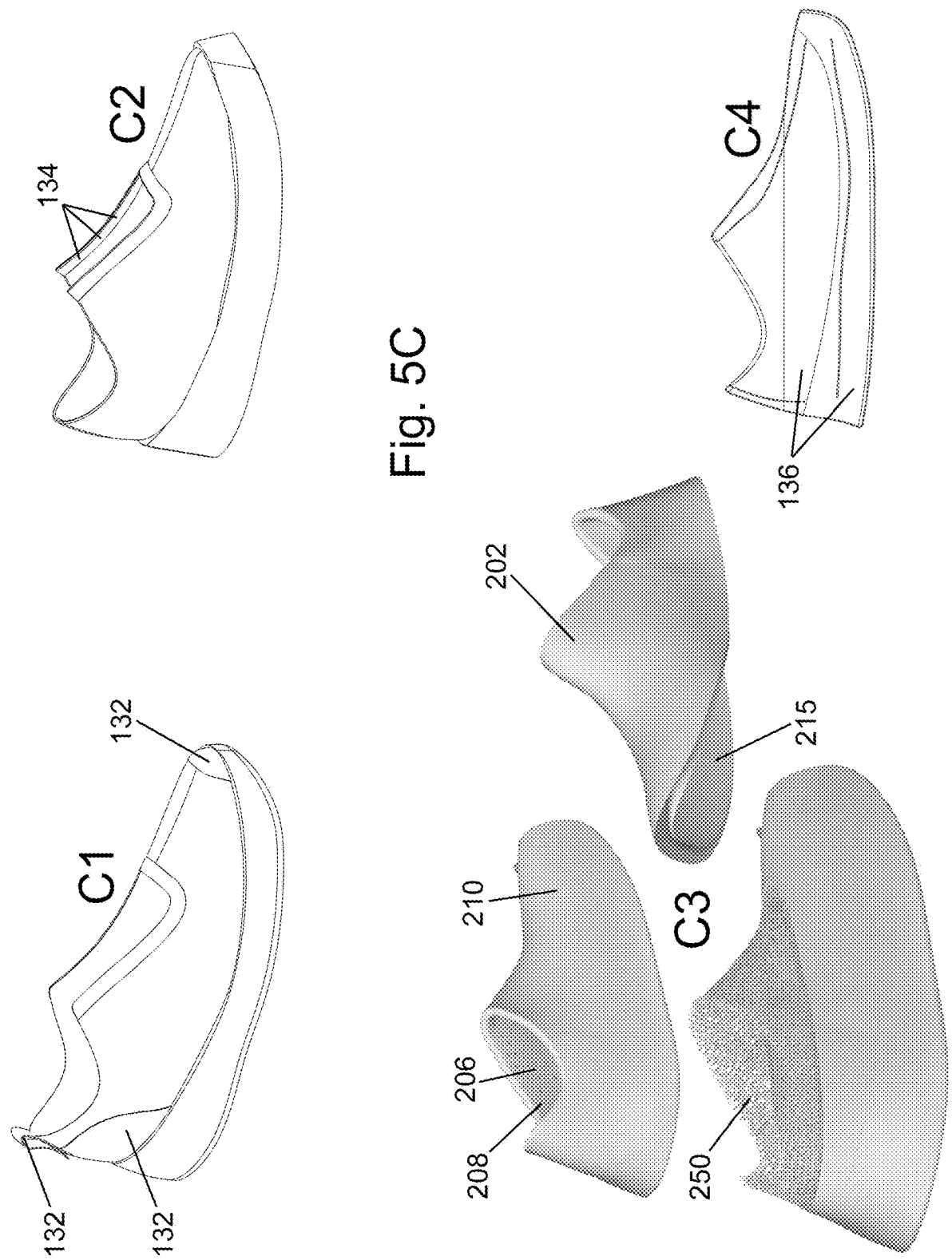
Figure 6:
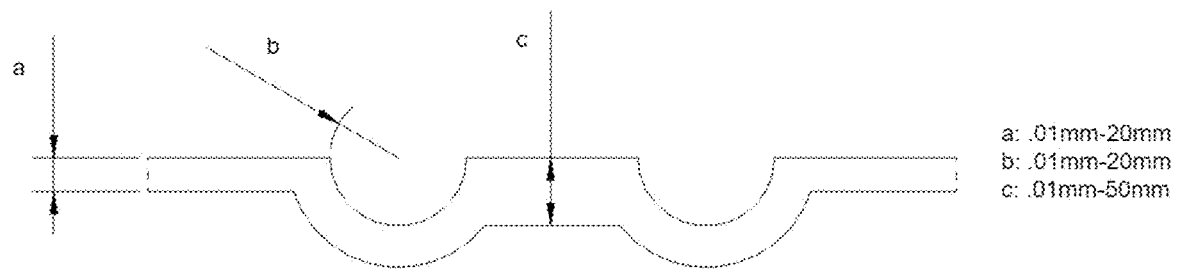
FIG. 6 illustrates typical dimensions for etched cosmetics.

The random point spacing for cellular structure is the primary method in which the cell size of the lattice is controlled. Random points are generated in a finite body and the number of points in the body drives the density of points per body. A high density of points in a body will create a very small cell size in the lattice, and a low density of points in a body will create a very large cell size in the lattice. The optimal density of the design is 0.001 points/cm$^3$-20 points/cm$^3$. This point density is unrelated to the lattice thickness whatsoever because density has no thickness, it is simply a rating of points per cm$^3$. The point density can fall anywhere within the cross-hatched region of the graph shown in FIG. 3.

The cell size and lattice thickness for variable strength to weight for the invention, has an optimal band in which the lowest size of the cell is 0.125 mm$^3$ and the highest size of the cell is 8,000 mm$^3$. The lowest size for the thickness of the beam in the lattice is 0.1 mm and the highest size of the thickness of the beam is 10 mm. The cross section of the beams in the lattice can be of any shape as denoted in the lattice type section of the material definition.

The cell size and lattice thickness for effective air flow within the invention has an optimal band in which the lowest size of the cell is 0.125 mm$^3$ and the highest size of the cell is 8,000 mm$^3$. The lowest size for the thickness of the beam in the lattice is 0.1 mm and the highest size of the thickness of the beam is 10 mm. As the cell size becomes smaller, and the lattice thickness becomes greater, the design becomes solid and no airflow can pass through there resulting in a zero effectiveness for airflow.

The cell size and lattice thickness for enhanced comfort in foot orthotics within the invention has an optimal band in which the lowest size of the cell is 0.125 mm$^3$ and the highest size of the cell is 8,000 mm$^3$. The lowest size for the thickness of the beam in the lattice is 0.1 mm and the highest size of the thickness of the beam is 10 mm. The cell size and lattice thickness can be critiqued for varying hardnesses, and as a result can provide different types of rigidity and comfort for different foot hardnesses and ailments.

This invention comprises a method in which 3D printed footwear can be conceptualized, prototyped, designed both physically and digitally and then finally designed with specific additive manufacturing processes in mind. After which the model is manufactured. Upon completion of printing, the components are cleaned and then in any combination, the components are bonded and coated, or coated and bonded to each other.

Figure 7:
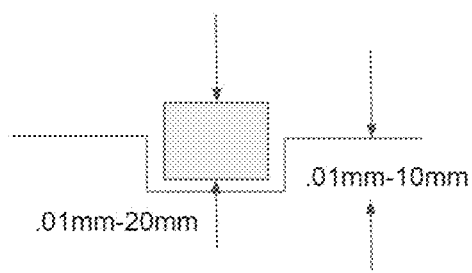
FIG. 7 illustrates typical ranges of dimensions for a cosmetic assembly aid.
Figure 8:
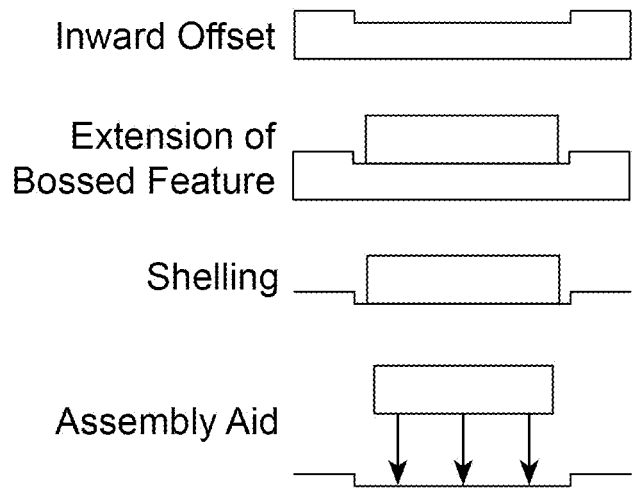
FIG. 8 illustrates typical 'onto wall' cosmetic design process steps.
Figure 9:
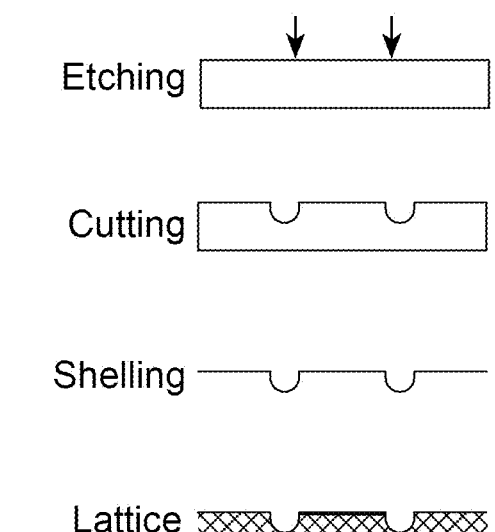
FIG. 9 is an illustration of an 'into wall' process to create etched cosmetics.
Figure 11:
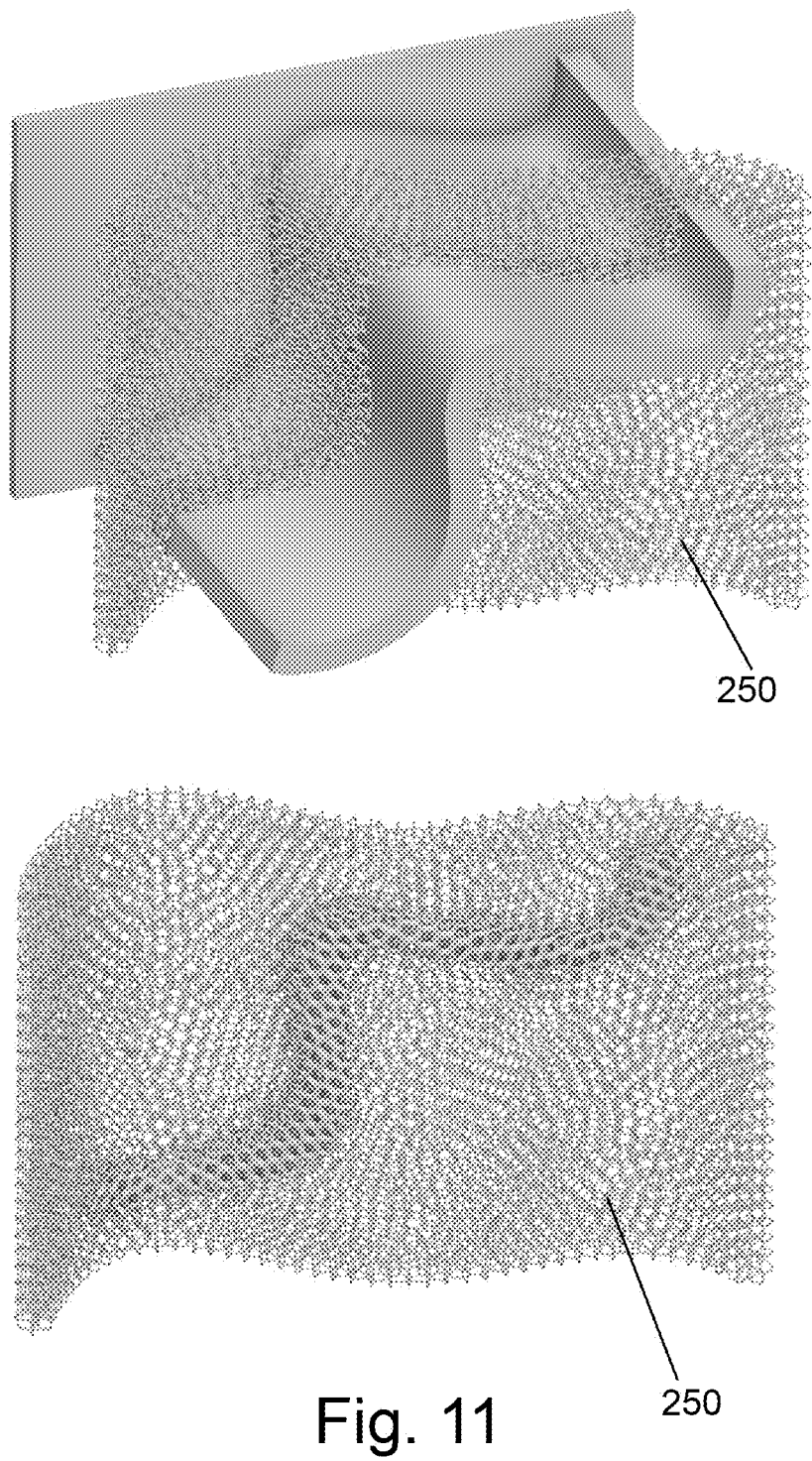
FIG. 11 is an illustration of lattices for increased comfort.
Figure 12:
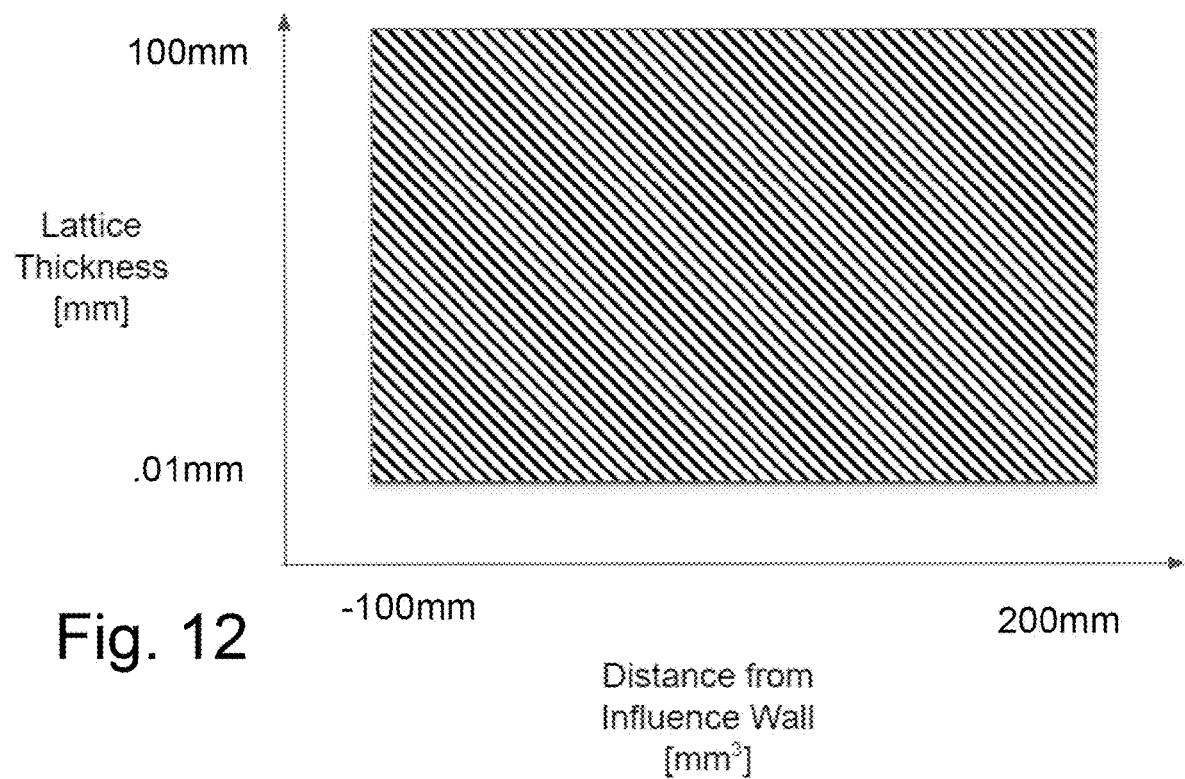
FIG. 12 is a graph of distances and spacings for increased comfort in foot orthotics.

First a 3D printed shoe last model 100 is designed in CAD using a first additive manufacturing design tool 106, such as "Solidworks", a parametric modeling software package. The shoe last model 100 is then produced via 3D printing in order to construct a conceptual model shoe last 104 from the last model 100. The conceptual model shoe last 104 is then 3D scanned with photogrammetry or documented with hand measurements to document the shapes and pieces of the shoe last 104. Once a conceptual scan or model or drawing is collected, the construction of the 3D printed shoe 108 can begin using a second additive manufacturing design tool 200, such as "nTopology", an implicit modeling software package. The conceptual model is then used to create a second solid upper 202 around the last and also a second solid lower 215 around the last model 100. Once the second solid upper 202 and second solid lower 215 are created from the conceptual model shoe 104, the last model 104 is subtracted from both the second solid upper 202 and the second solid lower 215 resulting in a perfect void foot space 114 between the two components in which the foot will lie. At this point the second solid upper 202 of the shoe has a positive draft 116 introduced to the interior and exterior walls in order to guarantee that the uppers will stack onto each other in the build platform of the printer. At this point, a joining rim 124 with dimensions shown in FIG. 7, is introduced in between the second solid upper 202 and second solid lower 215 of the shoe with the lower having the second solid interior wall 208 and the upper having the second solid upper exterior wall 210. This is done in order to create an assembly aid 126 after manufacturing.

At this point cosmetic features 132 of the shoe design are designed on top of the model of the second solid upper 202 and second solid lower 215 but the second solid upper 202 and second solid lower 215 are not merged with either model. It is at this point that shoelace anchor points 134 are designed into the shoe but they are also not merged with the shoe. Once the solid CAD bodies of the second solid upper 202 and second solid lower 215 have the last subtracted from them, they can be introduced into the second additive manufacturing design tool 200 and all of the solid walls of the second solid upper 202 are hollowed out 204 to a range of 0.01 mm-10 mm and many perforations 206 of multiple different shapes and sizes are added to the second solid upper interior wall 208. The second solid upper exterior wall 210 is not to be perforated in order to prevent any liquids or matter from entering the inside of the shoe. After this, a first organic lattice 250 is generated between the second solid upper interior wall 208 and second solid upper exterior wall 210 with specific cell dimensions taught in the other sections of this disclosure. Once the second solid upper 202 is hollowed 204, perforated 206, and the first organic lattice 250 is generated to fill the internal void, a similar process is completed to the second solid lower 215. For the second solid lower 215, a lower panel 136 of a thickness ranging from 0.01 mm-10 mm is sectioned out just below the sole of the foot. The rest of the second solid lower 215 is hollowed to 0.01 mm-10 mm, and a second organic lattice 224 is introduced into the hollowed void with a cell size and thickness taught in other sections of this disclosure and is then merged to the perforated lower panel 136. At this point, the outer walls of the second solid upper 202 and second solid lower 215 are textured to reflect the cosmetic features 132 of the conceptual design. After the CAD modeling is complete, the different shoe sizes of the models are mixed and sorted in order to generate a stacked build 232 upon each other in order of decreasing size in order to fully maximize the packing density of the prints. After a stacked build 232 is completed, the components are extracted and then cleaned. After all components are cleaned, the cosmetic components of the shoe are painted and then the second solid upper 202 and second solid lower 215 are first coated with a protective coating 230 and then they are bonded to each other to create a 3D printed shoe 108. Once the second solid upper 202 and second solid lower 215 are bonded to each other, the 3D printed shoe 108 cosmetic features 132 are coated with a protective coating 230 and then are bonded to the 3D printed shoe 108.

The process of adding cosmetic features 132 to 3D printed shoes is not well known. Described below is a process in which cosmetic features 132 are added to a 3D printed shoes while keeping the cost of the shoe low and also keeping the walls of the shoe within a certain thickness range so as not to add unnecessary strength. There are 2 types of cosmetic details in 3D printed shoes, those that are designed into the wall of the shoe, for example etched, and those that are designed on top of the wall of the shoe. The latter design creates an additional 3d printed piece.

For the etched cosmetic features into the wall, more CAD work needs to be done in a separate software. In order to make the cosmetic features visually and physically different from the rest of the exterior shoe wall, multiple actions need to be performed. First the etched contour of the cosmetic piece needs to be further cut out of the overall CAD face so that when the wall of the shoe is shelled to a thickness which is specified, an indention is made into the interior of the wall. Once the wall is shelled the first or second organic lattice 250, 224 structure is introduced, with a cell size that is defined in other sections of this disclosure, and an additional thickness parameter is applied to the interior of the etched cosmetic wall to increase the overall thickness to 0.01 mm-10 mm depending on the desired durometer of the cosmetic feature. Varying textures can then be applied to the cosmetic feature that has been designed into the wall or onto the wall.

The conceptual design of adding cosmetic details must first be performed and then the shoe itself must first be designed in the first step of the CAD process. In order to create a cosmetic feature that is designed into the wall of the shoe, the overall shape of the cosmetic feature must be etched into the face of the CAD body from the conceptual design sketch. In order to create a cosmetic feature that is designed on top of the wall of the shoe, the wall of the shoe must be offset inwards by a distance of 0.01 mm-10 mm in the shape of the cosmetic contour so that an additional piece can be extruded outwards by a distance of 0.01 mm-20 mm from the wall of the shoe to result in a bossed feature that is exposed the resultant distance outwards. By creating a "seat" for the cosmetic component to rest in, this allows for the wall thickness to remain thin and therefore the overall price of the shoe will remain as low as possible. This seat also becomes an assembly aid after the printing process is complete.

What is described below is a method to create and modify internal structures of a 3D printed foot show (orthotic) in order to increase comfort of the worn orthotic. While many publications address what can be manipulated below the foot in order to increase the comfort of a shoe or orthotic, there are far fewer publications that address what can be done above and to the sides of the shoe or orthotic in order to increase comfort.

Once the CAD design of the upper and lower has moved to the secondary CAD software, and the interior walls have been shelled and perforations have been added to the interior walls, it is then time to create the organic lattice structure in the void. It is in this void that extra internal components or lattice parameters are added in order to provide additional comfort. The cell size and the beam size of the lattice will be varied according to the needs of the patient in order to provide a soft pliable interior wall of the shoe where there are hard components of the patient's foot, and harder thicker interior walls will be made where the patient's foot is softer and needs more stability.

If the patient needs additional stability introduced into the walls of the shoe or orthotic, the cell structure of lattice and the beam thickness of the lattice can be thickened in vertical patterns or vertical truss patterns to create an additional vertical structure within the lattice structure itself.

Figure 15:
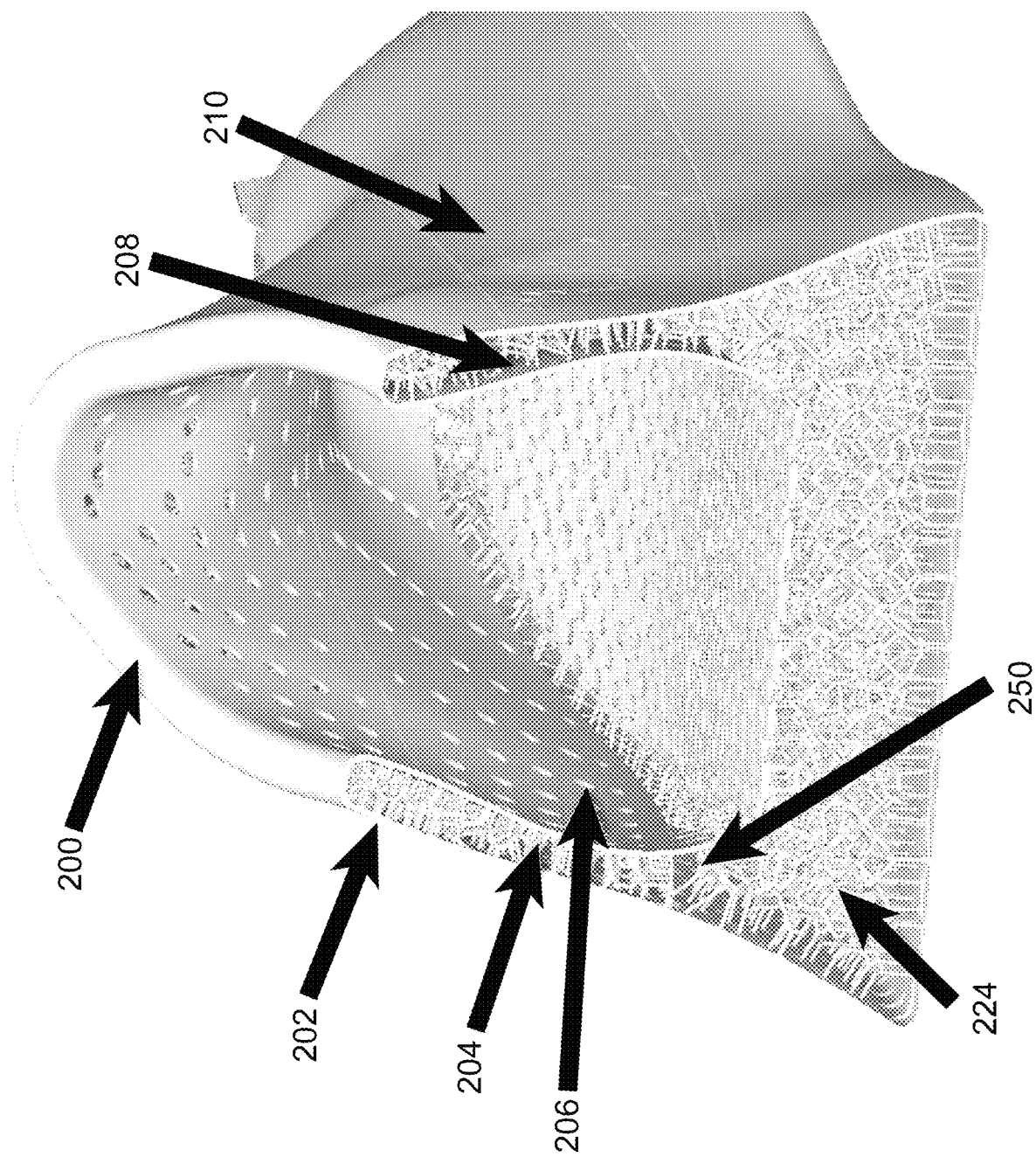
FIG. 15 is a section view showing typical components of a 3D printed shoe manufactured according to this disclosure.
Figure 16:
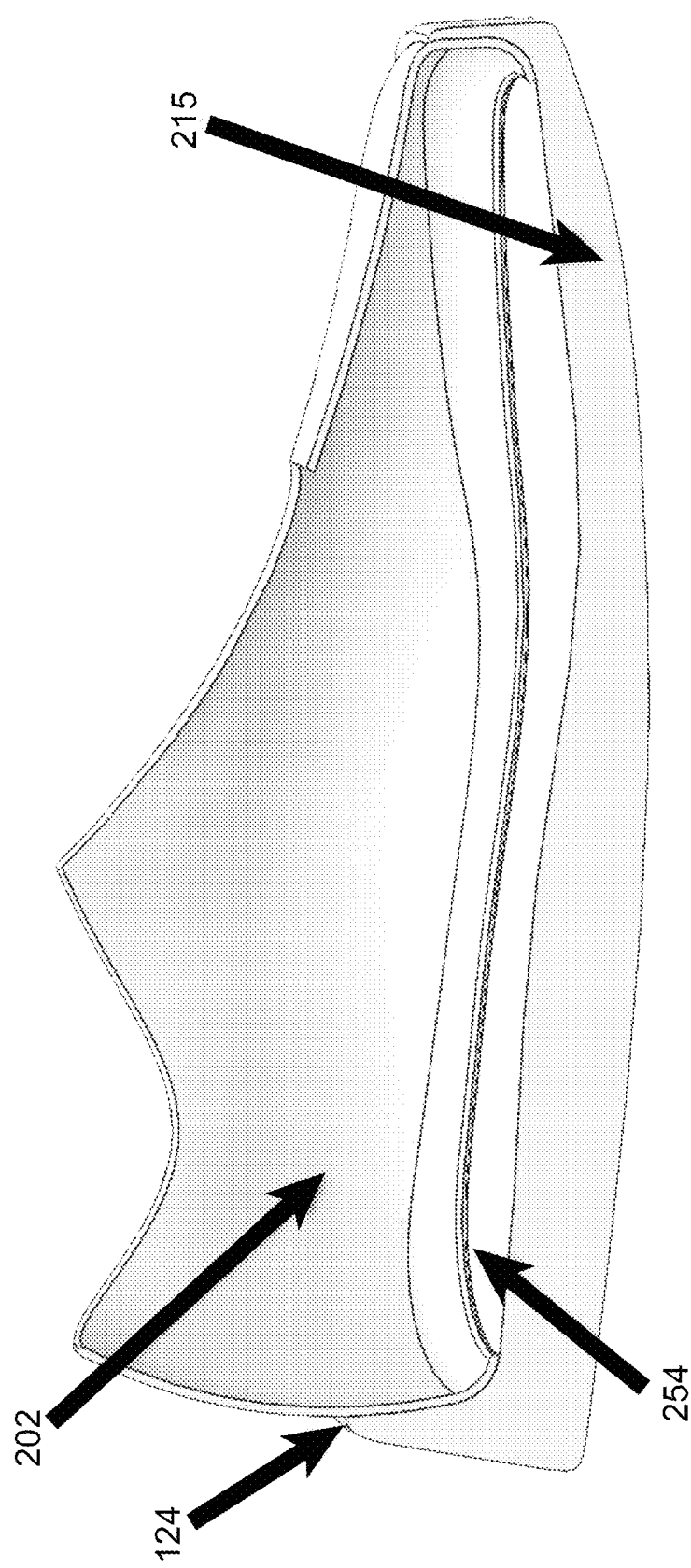
FIG. 16 is a side view showing typical components of a 3D printed shoe manufactured according to this disclosure.
Figure 17:
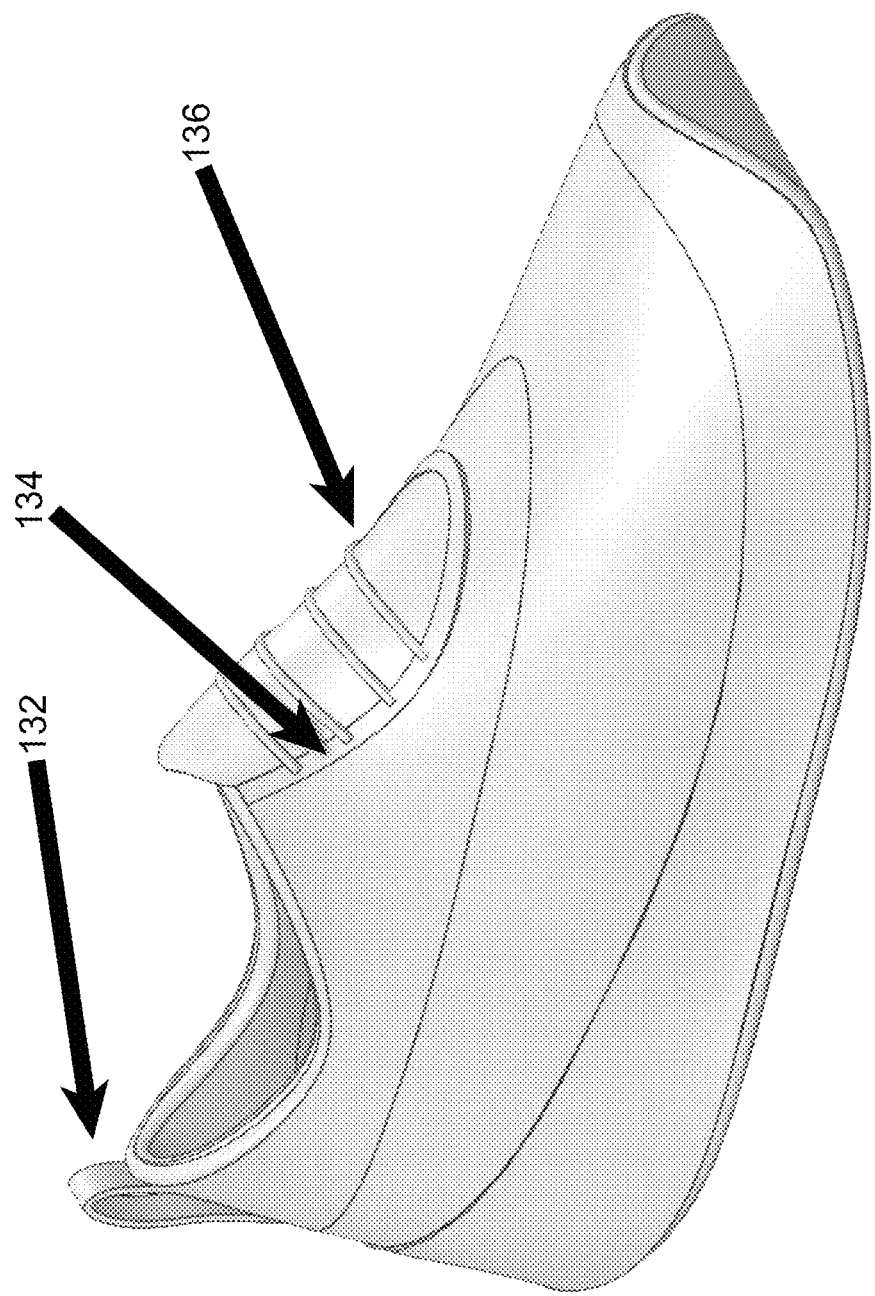
FIG. 17 is an isometric view showing typical components of a 3D printed shoe manufactured according to this disclosure.

The distance from the influence wall vs. lattice thickness and spacings for increased comfort in foot orthotics can fall anywhere within the cross-hatched region of the FIG. 15 graph.

What is described below is a method by which to design and create internal air passages and a bellows system inside the 3D printed shoe for increased ventilation and reduction of moisture collection. In a traditional bellows system, there is a moving membrane 254 that pressurizes air against a stationary membrane. The resulting pressurized air is evacuated along a predetermined path towards the exit nozzle. Once the air is evacuated, the moving membrane is moved away from the stationary membrane creating a pressure differential which in turn sucks in air from outside the system into the space between the stationary and moving membranes. The process is then repeated.

For the current shoe, the moving membrane 254 can be a panel of a thickness between 0.01 mm and 10 mm and has anywhere between 1 and 5000 perforations of any shape. The foot will lie on this membrane, and the stationary membrane is the thin hollowed out wall of the bottom and sides of the shoe lower. The thickness of these stationary membranes are anywhere between 0.01 mm and 10 mm. The evacuation channels of the bellows are the thin latticed walls of the upper with the final exit point of the air being the perforations in the very top of the interior wall of the upper.

When the user of the shoe puts their weight onto the shoe panel, the weight will compress the internal lattice structure of the lower and displace the majority of the air within the structure. This air will travel up through and past the panel and interact with the foot at every altitude. Some of the air will escape out of the shoe through the top. Once the user has released the weight off of the lattice structure, the structure will rebound and the pressure differential will introduce air back into the second organic lattice 224 structure.

In order for air to effectively ventilate the foot and move enough air through the passages, the stationary volume of air underneath the perforated membrane in the resting position must be greater than 0 cm$^3$ and less than 300 cm$^3$. If the stationary volume meets these criteria, the following equation must be followed in order to have effective air flow.

$$+\uparrow \Sigma F_y = F_S + F_D + F_A - F_f = 0 \qquad \text{Eq. 14-1}$$

$$= kx + c\dot{x} + \int \bar{v} \rho \bar{v} dA - F_f = 0 \qquad \text{Eq. 14-2}$$

Equations 14-1 and 14-2 represent the forces that act upon the perforated moving membrane. The following values are necessary for a functioning design.

| — | Minimum Value | Maximum Value |
| --- | --- | --- |
| Displacement x | 0 mm | 50 mm |
| Step impact velocity $\dot{x}$ | 0 m/s | 20 m/s |
| Air velocity v | 0 m/s | 30 m/s |
| Area dA | 0 mm$^2$ | 500 cm$^2$ |
| Step Force $F_f$ | 0N | 2000 |

Figure 13:
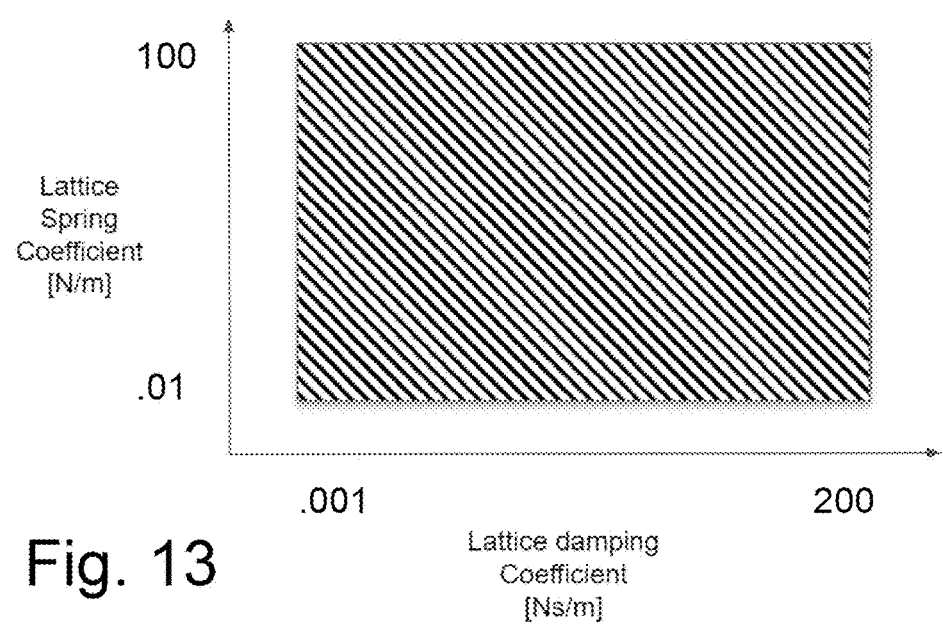
FIG. 13 is a graph of lattice spring coefficients versus lattice damping coefficients in mass balance for effective airflow.

Furthermore, the lattice spring coefficient (k) and damping coefficient (c) can align with the graph shown in FIG. 13 and can fall anywhere within the cross-hatched region of the FIG. 13 graph.

This written description uses examples of the disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method for producing a 3D printed shoe, comprising:
creating a 3D printed shoe last model in a CAD system connected to a 3D printer;
printing the 3D printed shoe last model for construction of a conceptual model shoe last;
documenting shapes and pieces of the conceptual model shoe last using at least one of hand measurements and 3D scanning;
initializing a first additive manufacturing design tool for construction of a 3D printed shoe in the CAD system by creating a first solid upper and a first solid lower from the conceptual model shoe last;
subtracting the 3D printed shoe last model from a combination of the first solid upper and the first solid lower resulting in a void foot space between the combination of the first solid upper and the first solid lower;
introducing a positive draft to interior walls of the first solid upper and exterior walls of the first solid lower to enable stacking onto each other on a build platform of the 3D printer;
generating an assembly aid with specific dimensions between the first solid upper and first solid lower of the 3D printed shoe with the first solid lower positioned adjacent interior walls of the assembly aid and the first solid upper positioned adjacent exterior walls of the assembly aid;
designing cosmetic features of the 3D printed shoe on top of the conceptual model shoe for the first solid upper or the first solid lower without merging;
adding anchor points for at least one shoelace into the first solid upper without merging;
initializing a second additive manufacturing design tool wherein walls in a second solid upper comprise hollowed-out walls in the second solid upper;
adding a plurality of perforations having different shapes and sizes to an interior wall of the second solid upper;
preventing an exterior wall of the second solid upper from being perforated, thereby preventing liquid or solid matter from entering the 3D printed shoe;
generating a first organic lattice between the second solid upper and a second solid lower;
hollowing, perforating, and a thickening the second solid upper and the first organic lattice to fill any internal voids;
lightly perforating a second solid lower perforated portion positioned below a sole of the foot;
hollowing a second solid lower hollowed portion;
introducing a second organic lattice into the second solid lower hollowed portion with a specific cell size and thickness;
merging the second solid upper to the second solid lower perforated portion;
texturing the second solid upper outer walls of the second solid upper lower walls to reflect the cosmetic features of the conceptual model shoe;
mixing and sorting different 3D printed shoe sizes in order of decreasing size for maximum packing density stacking of a 3D printed shoes build;
printing the 3D printed shoes build using a build material;
extracting, separating and cleaning the 3D printed shoes build;
painting the cosmetic features of the 3D printed shoe;
coating the second solid upper and second solid lower with a protective coating;
bonding the second solid upper and second solid lower to each other;
coating the cosmetic features with a protective coating; and
bonding the cosmetic features to the second solid upper and second solid lower to generate a ventilated 3D printed shoe.

2. The method of claim 1, wherein the first additive manufacturing design tool comprises parametric modeling software.

3. The method of claim 1, wherein the second additive manufacturing design tool comprises implicit modeling software.

4. The method of claim 1, wherein the build material comprises a powder with a polyurethane base.

5. The method of claim 1, wherein the build material is converted to the 3D printed shoe using powder bed fusion.

6. The method of claim 1, wherein the second solid upper walls are hollowed-out in the range of 0.01 mm to 10 mm.

7. The method of claim 1, wherein the second solid lower perforated portion comprises a thickness in the range of 0.01 mm to 10 mm.

8. The method of claim 1, wherein the second solid lower hollowed portion is hollowed in the range of 0.01 mm to 10 mm.

9. The method of claim 1, wherein the first and second organic lattice comprises a Voronoi type structure.

10. The method of claim 1, wherein the first and second organic lattice cell size is in the range of 0.125 mm$^3$ to 8,000 mm$^3$, and the cell lattice thickness is in a range 0.01 mm to 10 mm.

11. The method of claim 1, wherein a random point spacing for the first and second organic lattice is in the range of 0.001 points/cm$^3$ to 20 points/cm$^3$.

12. The method of claim 1, wherein the cosmetic features are disposed onto an exterior wall of the 3D printed shoe.

13. The method of claim 1, wherein the cosmetic features are disposed into a recessed portion of an exterior wall of the 3D printed shoe.

14. The method of claim 1, further comprising pressurizing ambient air in the second organic lattice using a moving membrane, thereby evacuating the ambient air along a predetermined path towards an exit nozzle.

* * * * *